United States Patent [19]

van der Lely

[11] 4,084,394
[45] Apr. 18, 1978

[54] HARVESTER

[75] Inventor: Cornelis van der Lely, Zug, Switzerland

[73] Assignee: C. van der Lely N.V., Maasland, Netherlands

[21] Appl. No.: 607,762

[22] Filed: Aug. 26, 1975

[30] Foreign Application Priority Data

Sep. 2, 1974 Netherlands .......................... 7411599

[51] Int. Cl.² ............................................ A01D 45/02
[52] U.S. Cl. ......................................... 56/14.6; 56/228
[58] Field of Search ....................... 56/14.5, 14.6, 6, 7, 56/228, 1, 10.1

[56] References Cited

U.S. PATENT DOCUMENTS

| 2,753,674 | 7/1956 | Cunningham, Jr. et al. | 56/6 |
| 3,538,689 | 11/1970 | van der Lely | 56/14.6 |
| 3,705,560 | 12/1972 | Lappin | 56/228 X |
| 3,794,046 | 2/1974 | Muijs | 56/14.6 X |

Primary Examiner—Russell R. Kinsey

[57] ABSTRACT

A harvester machine includes a plurality of harvester units that can be positioned side-by-side in a row that extends across the direction of operative travel in front of a tractor. The tractor is connected to a first coupling to push the machine when processing crop and a second coupling at one side of the machine can be used to tow the machine during transport; the units then being located one behind the other. Each unit includes cutting, threshing and cleaning means and a delivery device communicates with the units to remove grain through one or more outlets that extend over the tractor to a rear container. The units are interconnected by pivot connections at their sides with pivot axes extending in the direction of operative travel. Adjustable castor wheels support the units at the desired height and a common drive from the tractor engages the various threshing, cleaning, mowing and delivery devices including blowers.

7 Claims, 6 Drawing Figures

HARVESTER

SUMMARY OF THE INVENTION

According to the invention, the harvester is provided with coupling means by which it can be coupled with the front of a tractor such as disclosed in U.S. Pat. Nos. 3,721,077; 3,720,047 and 3,878,956 the disclosures of which are incorporated by reference.

In operation, the machine is located in front of the tractor and further coupling means are provided for transporting the machine in a position differing by at least substantially 90° from the operational position of the machine. By means of this construction the machine in operation as a whole can be arranged in front of the tractor, whereas for transport purposes the machine can be located to the rear of the tractor and transported lengthwise.

For a better understanding of the invention and to show how the same may be carried into effect, reference will be made by way of example to the accompanying drawing.

DESCRIPTION OF THE PREFERRED EMBODIMENT

Figure 1:
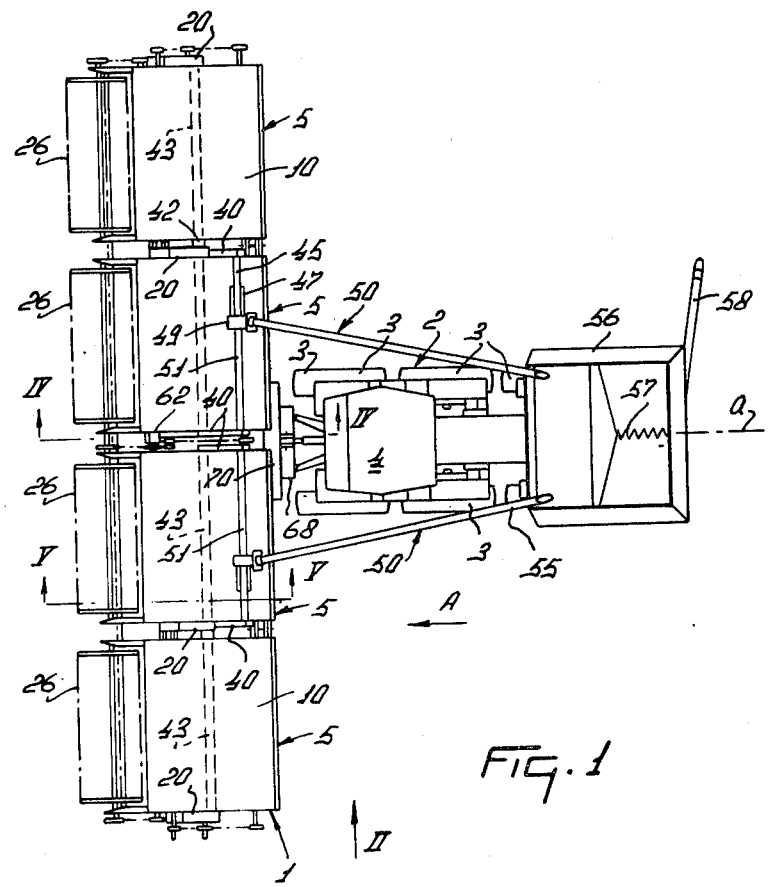
FIG. 1 is a plan view of a harvester attached to the front of the tractor.

The harvester 1 shown in the Figures, forming a combine harvester, is attached in operation to the lifting device at the front of a tractor 2. The tractor 2 has three pairs of aligned wheels 3, the foremost and hindmost wheels being steerable wheels. The tractor 2 comprises a cabin 4 at the front. The harvester 1 comprises four identically constructed units 5 arranged side-by-side. The units cooperate with one another in operation and each includes a crop moving, threshing and cleaning mechanism. One of the units will be described more fully hereinafter.

Figure 5:
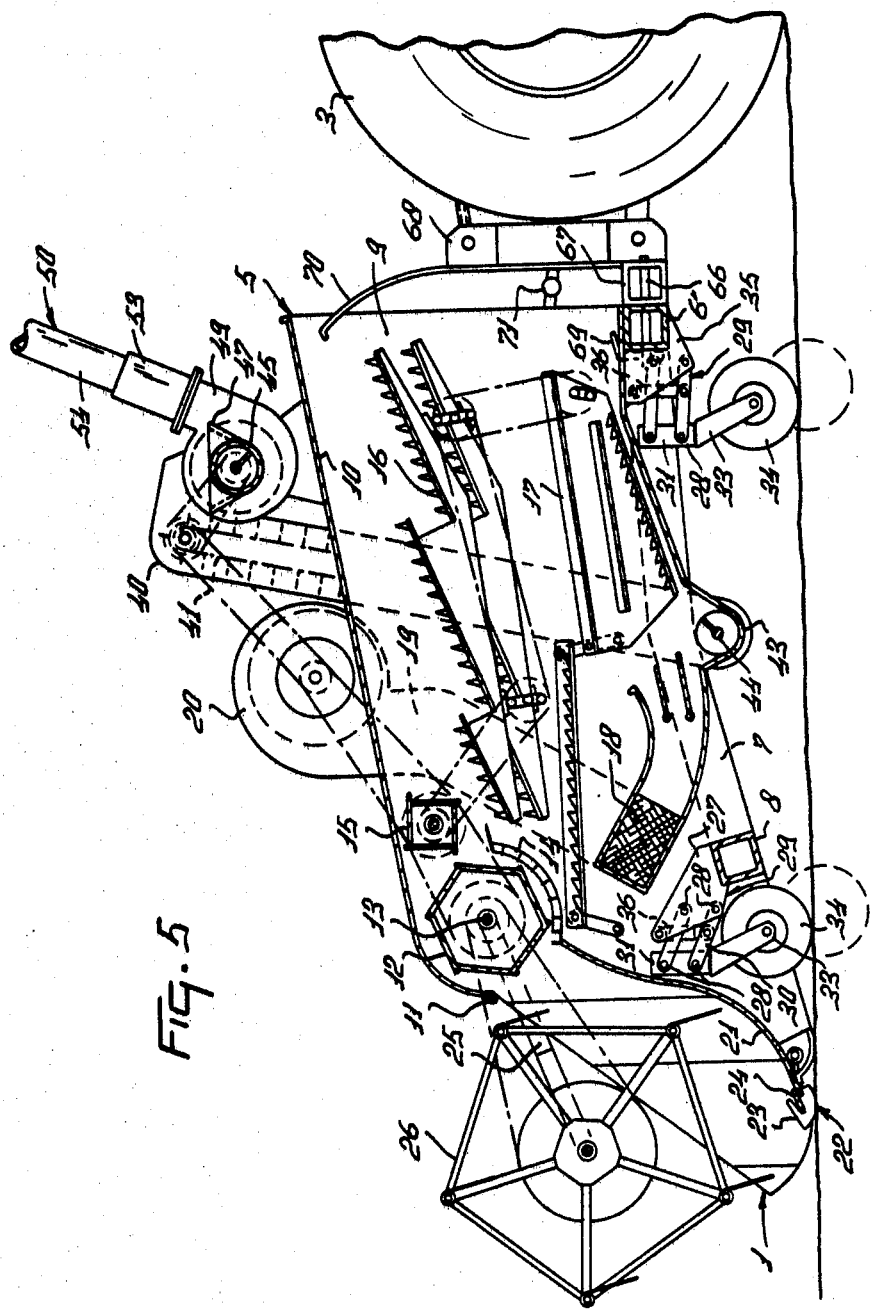
FIG. 5 is an enlarged elevational view taken on the line V—V in FIG. 1.

Referring to FIG. 1, two units 5 are arranged on either side of the longitudinal center line *a* of the tractor 2. Each unit 5 comprises at least one substantially horizontal, hollow frame beam 6 extending in operation transversely of the intended direction of movement of the machine and having in this embodiment a square section (FIG. 5). To the frame beam 6 are fastened longitudinal beams 7 extending in operation in the intended direction of movement A and having, in plan, a straight shape, but viewed from aside, they are bent near the centers, the foremost portion being inclined downwardly. The front ends of the beams 7, which are also hollow, are interconnected by means of a hollow transverse beam 8 of square section. The frame formed by the beams 6, 7 and 8 is provided on its sides with vertical walls 9 of sheet material, which are, viewed from aside, inclined at the front from top to bottom and which are slightly rounded off on the bottom side to the rear. At the top side the sidewalls 9 of a unit 5 are interconnected by a plate forming a top wall 10. The wall 10 is bent at the front in a downward direction over a given distance and joins a transverse joint 11 between the walls 9. Between the walls 9, at the front, just behind the bent-over front end of the top wall 10 a threshing drum 12 is arranged with its rotary shaft 13 extending in operation transversely of the direction of movement A. A threaded jacket or concave 14 co-operates with the threshing drum 12. Behind the threshing drum 12 and above the concave 14 a straw deflector 15 is provided. A shaker 16 is arranged behind the concave 14. Beneath the shaker 16 a cleaning device 17 is arranged. The air is supplied to the cleaning device through a transverse chute 18 located in front of the cleaning device and opening out beyond the sidewall of the unit and terminating in an upwardly extending channel 19, which joins the housing of a blower 20, which is arranged near the top side on the unit.

It is apparent from FIG. 1 that with the units located on either side of the longitudinal center line *a* of the tractor 2 the respective blowers 20 are located on the sides remote from the longitudinal center line. A plate 21 joins the threshing concave 14 and extends substantially in the form of an S inclined downwardly and forwardly, viewed from aside. The bottom edge the plate 21 is provided with a cutting mechanism 22 comprising a finger bar 23 with which part of a cutter bar 24 common to all units is adapted to co-operate. Above the cutting mechanism 22 a reel 26 is arranged by means of arms 25. The arms 25 are adapted to pivot about axes coinciding with the rotary axis 13 of the threshing drum 12. The reel 26 can be displaced vertically by means of the pivotable arms 25 with the aid of a hydraulic setting cylinder (not shown). Near the ends of the transverse beam 8 pairs of plates 27 extend upwardly and forwardly, between which parallel arms 30 forming a parallelogram structure are pivotally arranged by means of pins 28. The arms 30 have their other ends pivotally connected by means of pins 28 with an upright sleeve 31. The sleeve 31 accommodates a pivotable shaft 32. At the lower end the shaft 32 is provided with a downwardly inclined bracket 33, between the limbs of which is arranged a ground wheel 34.

In this way two castor ground wheels 34 are fastened at a given distance from one another near the ends of the beam 8. In a similar manner castor ground wheels 34 are arranged by means of pairs of plates 35 on the hindmost frame beam 6. Between the arms 30 an upright hydraulic setting cylinder 36 is arranged between the lower arm 30 of the respective parallelogram structures 29 and the top side of a supporting plate 27 or 35 respectively, for adjusting the position of the ground wheels 34 with respect to the respective beams 6 and 8 and hence for regulating the height of the cutting mechanism 22 above the ground.

Figure 4:
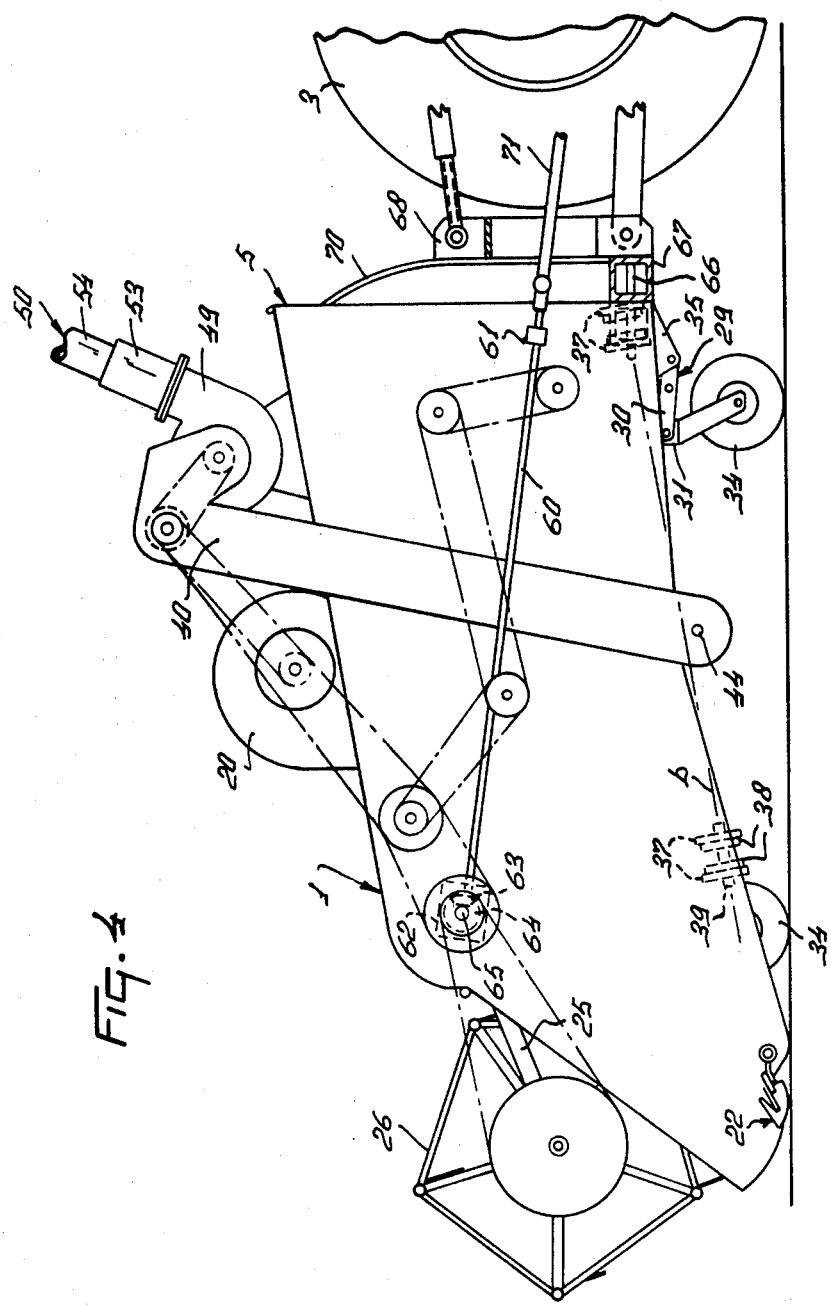
FIG. 4 is an enlarged elevational view taken on the line IV—IV in FIG. 1.

On the facing sides, at the level of the beams 6 and 8, between the walls 9 of adjacent units 5 pairs of tags 37 and 38 respectively are arranged so that they overlap over a given distance and are interconnected by means of pivotal pins 39, whose longitudinal center lines are in line with one another (FIG. 4). The longitudinal center lines *b* of the pins constitute in operation pivotal axes extending parallel to a plane in the direction of movement A between the respective units 5, said axes being inclined to the rear. The cutting mechanism 22 comprising for each unit 5 a finger bar 23 with which the common cutter bar 24 is adapted to co-operate, is constructed so that it is flexible at least in the junctions of the parts because the common cutter 24 is made from flexible material. The resultant flexibility of the cutting mechanism 22 is sufficient for enabling a restricted deflection about the aforesaid pivotal axes between the respective units 5 in operation so that despite the large working width of the machine an effective adaptation to any unevennesses of the ground can be obtained.

Figure 2:
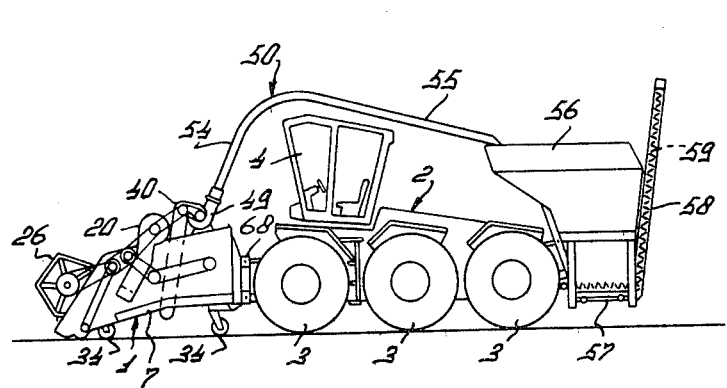
FIG. 2 is a side elevational view in the direction of the arrow II in FIG. 1.
Figure 6:
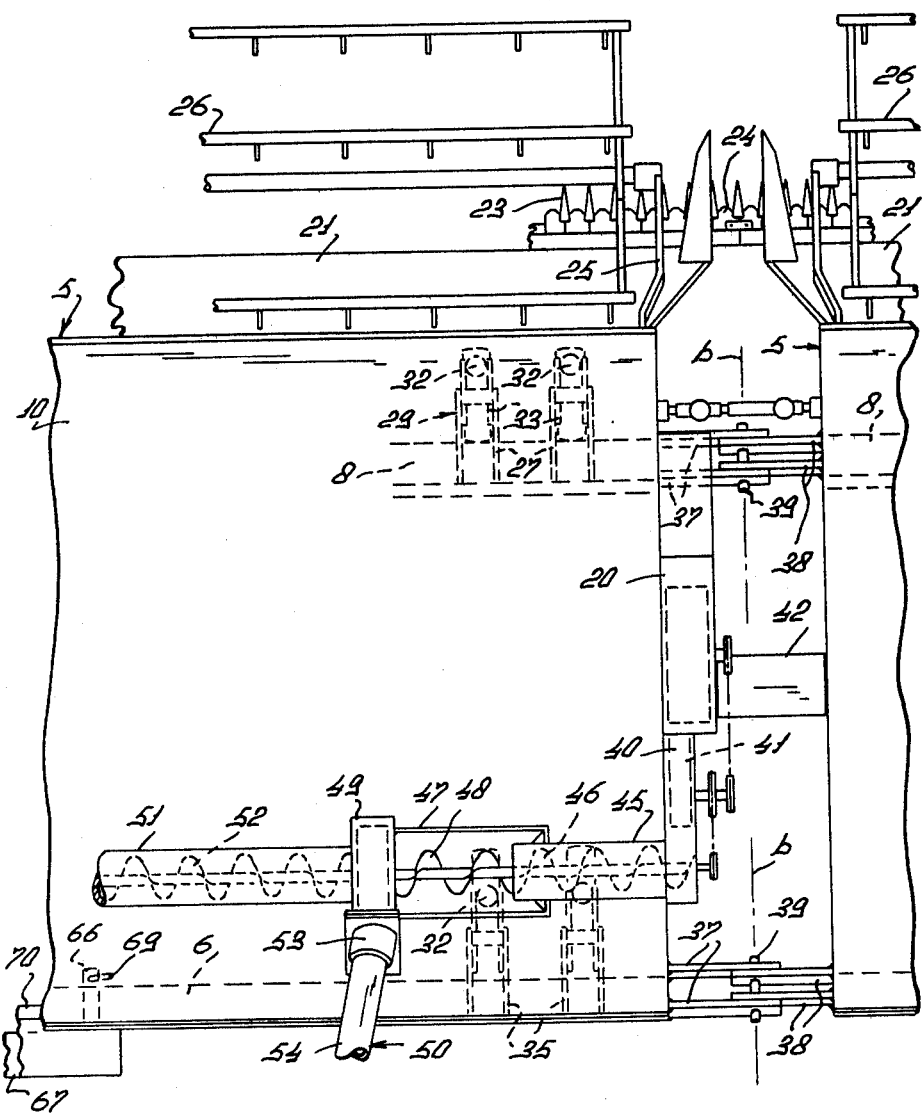
FIG. 6 is a fragmentary plan view in section of the coupling gear between an outermost and a central unit of the machine.

On the side remote from the longitudinal center line $a$ of the tractor 2 the central units are provided with an endless belt-type elevator 41 accommodated in a housing 40. On the lower side, the housing 40 joins, through a flexible connection 42, an auger conveyor receiving housing 43 extending in operation transversely of the direction of movement A and located beneath the cleaning mechanism 17 of an outermost unit, which housing accommodates an auger delivery conveyor 44 (FIGS. 5 and 6). The housing 40 comprising elevator 41 opens out on the top side in a pipe 45 extending in operation transversely of the direction of movement and accommodating a auger conveyor 46. The pipe 45 opens out above a trough-shaped part 47 holding a worm conveyor 48 and joining the housing of a blower 49 located on the bottom side of an outlet conduit 50. On the other side the housing of the blower 49 is joined by a pipe 51 holding a worm conveyor 52, said pipe joining by its other end the top side of the housing 40 of elevator 41 located on the side of the longitudinal center line $a$ of the tractor 2. The housing 40 of the elevator communicates with the space 43 beneath a central unit. The housing of the blower 49 communicates on the top side through a rotatable member 53 with the outlet conduit 50 comprising an upwardly extending part 54, which terminates at an area at a higher level than the cabin 4 of the tractor in a substantially horizontal part 55, which is slightly inclined downwardly and rearwardly and opens out above the top side of a container 56, which is connected with the three-point lifting device on the rear side of the tractor 2. (FIG. 2).

Figure 3:
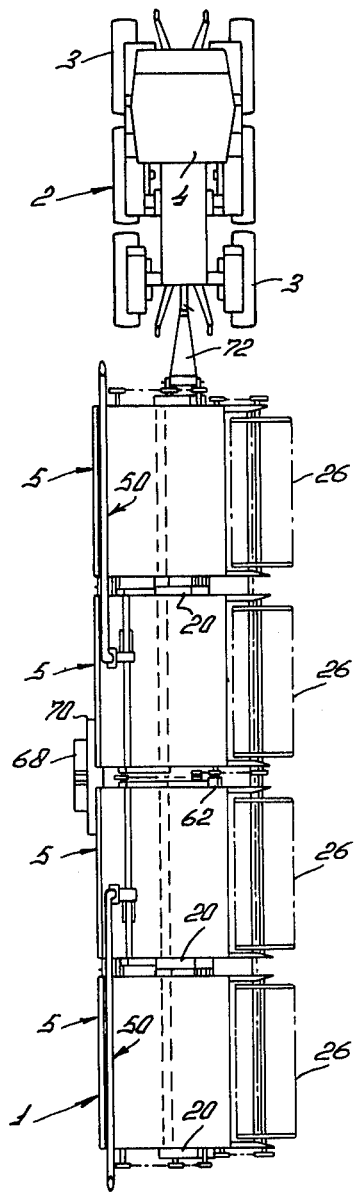
FIG. 3 is a plan view of the harvester in the transport position.

FIG. 1 shows that a delivery structure of the kind described above is provided for each pair of units 5 located on one side of the longitudinal center line of the tractor. The outlet conduits 50 leading to the container 56 are adapted to be turned by means of the rotatable member 53 about an axis which at least substantially coincides with the longitudinal center line of the upright part 54. By turning about said axis through about 90° said outlet conduits 50 can be moved into a position as shown in FIG. 3, which they occupy during the transport of the machine. The container 56 attached to the rear lifting device of the tractor extends downwardly in the form of a funnel, the bottom side being provided with a worm conveyor 57 extending in operation in the direction of movement as far as into the lower end of an upwardly and rearwardly inclined pipe 58 holding a worm conveyor 59 for delivering in conjunction with the worm conveyor 57 the produce fed into the container.

For driving the movable parts of the respective units 5 a shaft 60 extending in the direction of movement is arranged at the front between the central units; near its end located on the side of the tractor said shaft is held in a bearing 61, whereas the other end is journalled in a gear box 62, in which the shaft is drivably connected through a bevel gear wheel 63 with a bevel gear wheel 64 on a telescopic shaft 65, which interconnects the rotary shafts 13 of the threshing drums 12 of the central units (FIG. 4). The shafts 13 of the threshing drums 12 of the central units are connected through universal joints and telescopic shafts with the rotary shafts of the threshing drums 12 of the outermost units. The shafts 13 of the threshing drums of the respective units 5 provide for each of the movable parts of the units a drive as shown schematically in FIG. 5. Through endless members and pulleys the straw deflector 15, the shaker 16 and the sieves of the cleaning mechanism 17, the blowers 20 near the top side, the reel 26 and the elevator 41 and the blower 49 are driven for the delivery of the gathered produce. For driving the common, flexible cutter 24 of the cutter mechanism 22 the outer side of one of the outermost units is provided with a transmission also drivably connected with the rotary shaft of a threshing drum 12.

The beams 6 of the central units have near the center an opening receiving a pin 66 arranged on a transverse beam 67, which is provided near its center with a trestle 68 for coupling with the three-point lift of the tractor 2. The pins 66 are locked in the apertures of the beams 6 by means of safety pins 69 (FIG. 5). The beam 67 is provided for each of the central units with a screening plate 70, which is bent over on the top side towards the interior of a unit. The plates 70 prevent tailings emanating from the shaker 16 from striking the tractor cabin.

In operation, the machine is coupled by the coupling means formed by the trestle 68 on the longer side of the machine with the three-point lift on the front side of the tractor, while the driving shaft 60 is connected through an auxiliary shaft 71 with the power take-off shaft of the tractor for driving the respective movable parts of the units via the transmissions described above. By means of the hydraulic setting cylinders 36 of the parallelogram structures 29, which cylinders like the hydraulic cylinders of the respective reels 26 communicate in a manner not shown with the hydraulic system of the tractor, the position of the ground wheels 34 can be adjusted with respect to the frame formed by the beams 6 to 8, the height of the cutting mechanism 22 above the ground being thus determined. During the movement of the machine in the direction of the arrow A it is completely located in front of the tractor and a strip of crop having a width four times the width of one unit, hence a width of 12 meters is cut by the respective cutting mechanisms of the units relatively movable by means of the pins 66 with respect to the transverse beam 67 and by means of the pins 39 relative to one another. The cut crop is conducted by the respective reels 26 along the upwardly extending plate 21 within reach of the respective threshing drums 12. The threshed produce is cleaned by means of the straw shaker 16 and cleaning device 17 of each unit and collected in the spaces 43 located beneath the respective units, in which the worm conveyors 44 discharge the produce via elevator 41 and the delivery device into the container 56 on the rear side of the tractor. When the container 56 is filled it is discharged into a wagon via the aforesaid worm conveyors 57 and 59, which may be driven by the power take-off shaft of the tractor, after which the harvesting operation can be continued.

In operation, the assembly is readily steerable owing to the steerability of the front and rear wheels 3 of the tractor 2. The cabin 4 at the front of the tractor allows the driver to have a satisfactory survey of the operations to be carried out. If the machine described above has to be transported, the container 56 is disengaged from the rear side of the tractor and after the respective outlets 50 have been turned into the position shown in FIG. 3 the machine is discoupled from the front of the tractor. Subsequently, the rear side of the tractor is coupled with the tiltable coupling means 72 arranged on a sidewall of one of the outermost units so that the machine may be transported in its direction of length as is shown in FIG. 3. The castor ground wheels 34 near the front and rear sides of each unit automatically turn into a position differing by 90°. If desired, locking means may be provided for fixing at least the hindmost pairs of ground wheels of the unit which is hindmost in operation after having been turned through 90°. For transporting the machine the container 56 may be provided on the rear side with a draw hook with which the machine can be attached. In this case the container need not be disengaged.

The construction depicted above provides a harvester, particularly a combine harvester of large working width, comprising a plurality of—preferably four—units located side-by-side in operation and being capable in operation of effectively matching unevennesses of the ground by turning about the aforesaid pins 39 with respect to one another, the cutting mechanism 22 comprising the flexible cutter 24 allowing such a turn. The machine can be transported along the road without causing any danger to the further traffic.

The invention is not restricted to the foregoing specification but also relates to all details and equivalents thereof whether described or not described.

Having thus described my invention, what I claim as new and desire to secure by Letters Patent of the United States is:

1. A harvester machine for attachment to a tractor comprising a plurality of harvester units, said units each having a frame and the frames of the units being interconnected by pivot means which are provided at their adjacent sides, said units extending transversely side by side relative to the direction of operative travel, each said unit comprising cutting, threshing and cleaning mechanisms, common coupling means for said units on the machine for connection to a three point lifting hitch provided at the front of the tractor, a container attached at the rear of the tractor wherein a delivery device is positioned to receive processed crop from at least one harvester unit, said device having at least one outlet conduit extending over the tractor to its rear with an opening above said container.

2. A harvester as claimed in claim 1, wherein said common coupling means is attached to the frames of two of said units at the approximate center of said harvester, said units being relatively pivotable about pivot axes of said pivot means, said pivot axes extending in a plane substantially parallel to the direction of operative travel of the machine.

3. A harvester as claimed in claim 1, wherein a common outlet is provided which communicates with two side-by-side units, said outlet extending initially upwardly and then at least substantially horizontally.

4. A harvester as claimed in claim 1, wherein said outlet includes a pivot joint adjacent the bottom thereof, and one part of said outlet is turnable with respect to a second part thereof through at least about 90° either into an operative position or into a transport position, a blower being located adjacent the bottom of said second part.

5. A harvester machine for attachment to a tractor comprising a plurality of harvester units, said units each having a frame, said frames of the units being interconnected by pivot means provided at their adjacent sides, said units extending side by side transverse to the direction of the machine's operative travel, each unit comprising cutting, threshing and cleaning mechanisms, driving means connected to said mechanisms, said driving means including a transmission located between two centrally positioned of said units, and delivery outlet means mounted on the latter two units, said threshing mechanisms of each unit comprising a drum mounted on a rotatable shaft, a said cleaning mechanism being in driven engagement with a said rotatable shaft of said central unit, the rotary shafts of said drums of the respective units being in line with one another and driveably interconnected by means of telescopic shafts and universal couplings.

6. A harvester as claimed in claim 5, wherein there are two outermost units, an outlet for the gathered produce being located on the bottom side of each said outermost unit, said outlets of these units extending transverse to the direction of operative travel and communicating through a flexible joint with further outlets for gathering produce provided in said central units.

7. A harvester machine for attachment to a tractor comprising a plurality of harvester units, said units being interconnected and having common coupling means at the rear of said machine connectable to a three-point lifting hitch extending from the front of said tractor with respect to the normal direction of travel, a container attached at the rear of the tractor wherein a delivery device is positioned to receive processed crop from at least one harvester unit, said device having an outlet extending over the tractor to its rear and opening out above said container, said units being positioned side-by-side transverse to the direction of travel and in front of the tractor during harvesting operations, further coupling means provided on the machine adjacent one side thereof, said units being connectable by said further coupling means to the tractor and being interconnected whereby they are aligned to trail the tractor one after another in a transport position.

* * * * *